United States Patent Office 2,975,586
Patented Mar. 21, 1961

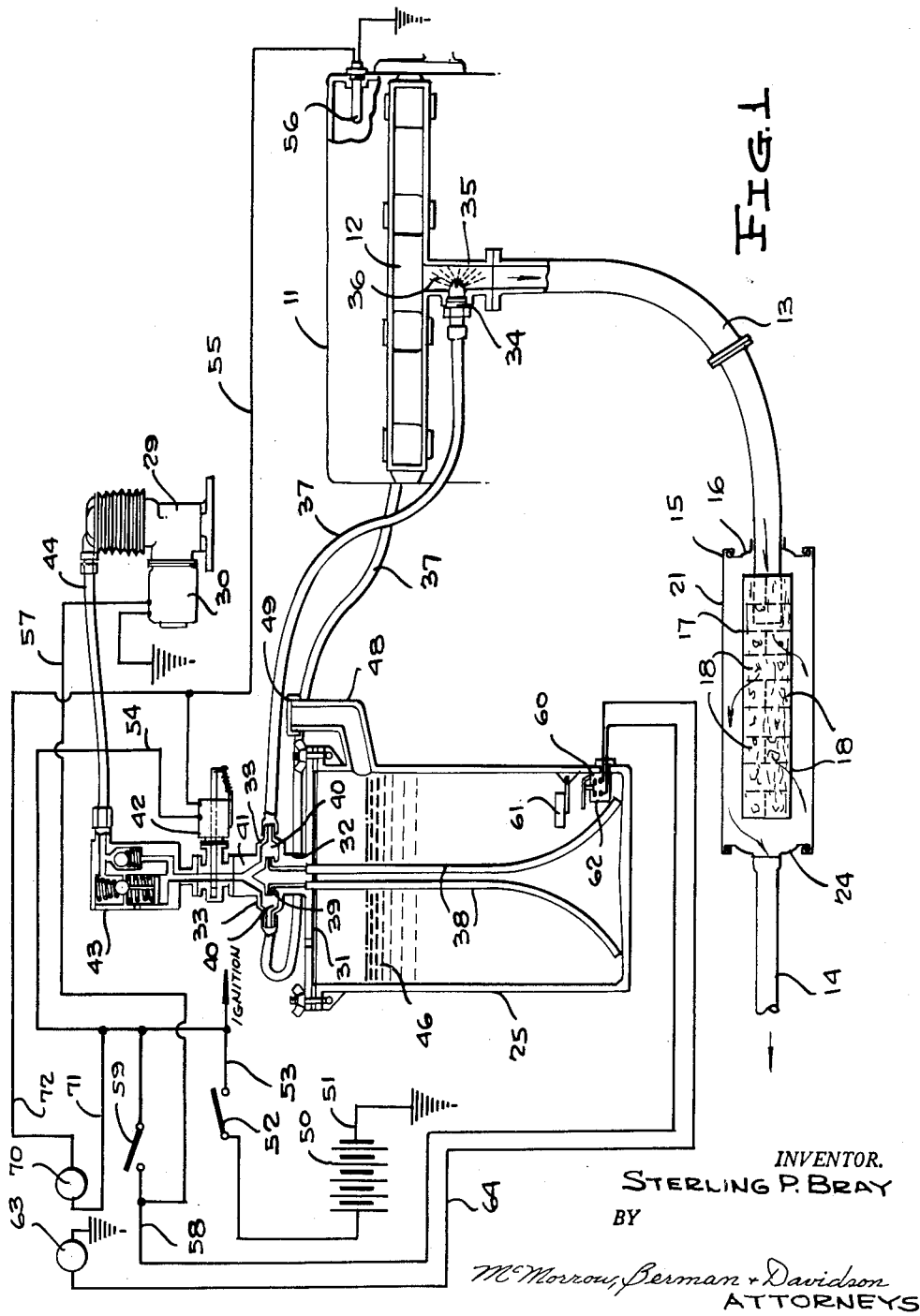

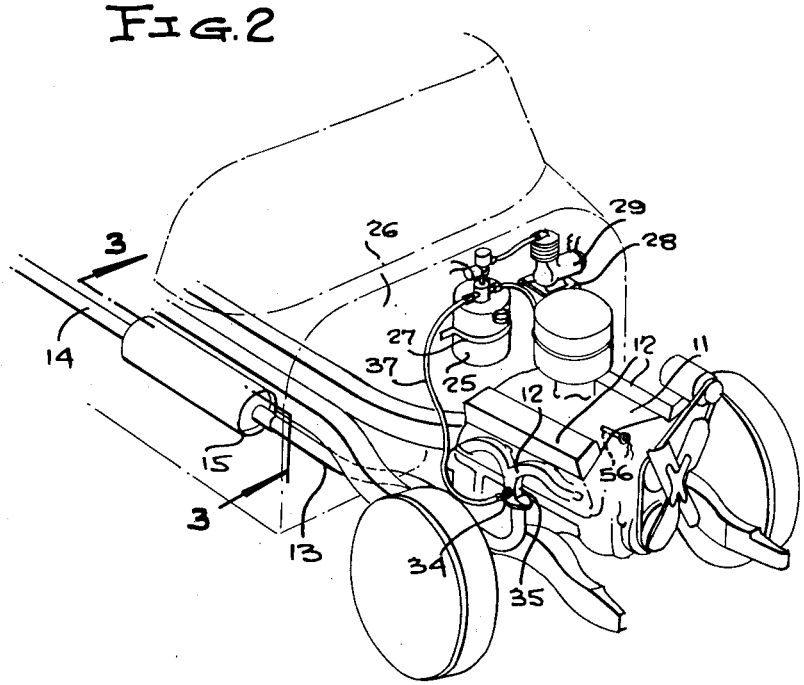
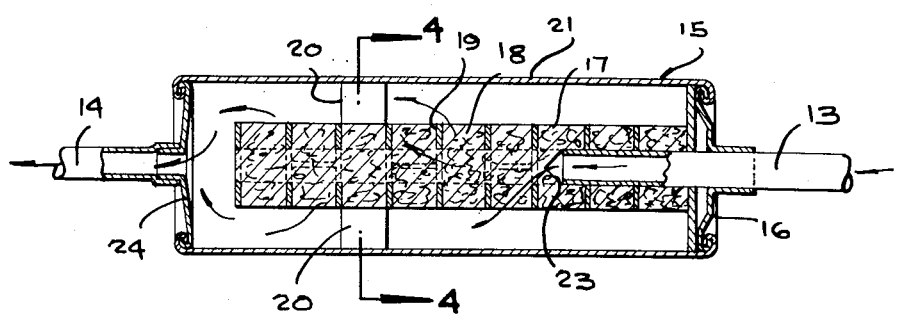
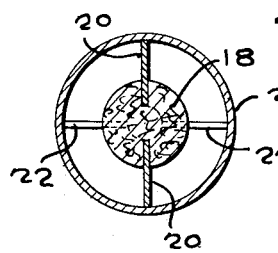

2,975,586

SMOKE VAPORIZER

Sterling P. Bray, 521 N. Orange Ave., Modesto, Calif.

Filed July 2, 1959, Ser. No. 824,694

3 Claims. (Cl. 60—30)

This invention relates to gas absorbing devices, and more particularly to a vaporizing device for use with internal combustion engines, either of the type employed in automobiles, or of the stationary type.

A main object of the invention is to provide a novel and improved smoke absorbing device which is relatively simple in construction, which is easy to install, and which provides a thorough smoke-absorbing action and which is particularly useful in reducing the amount of exhaust gas from automobiles, and which may also be employed in industrial plants where smoke is produced, by using a suitable chemical vaporizing agent in accordance with the type of fuel producing the smoke.

A further object of the invention is to provide an improved smoke vaporizing device which is relatively inexpensive to produce, which involves only a few parts, which is reliable in operation, and which is relatively compact in size so that it may be easily and conveniently installed on an automobile or other vehicle in a position adjacent the engine of the vehicle, or in any other convenient location on an automobile or truck such that the fluid line of the device could be connected to the exhaust manifold of the automobile or truck engine.

Further objects and advantages of the invention will become apparent from the following description and claims, and from the accompanying drawings, wherein:

Figure 1 is a schematic diagram showing an improved smoke absorbing apparatus according to the present invention and illustrating the electrical connections thereof.

Figure 2 is a perspective view of a portion of a motor vehicle showing the engine of the vehicle and a smoke absorbing apparatus according to the present invention installed adjacent the engine.

Figure 3 is an enlarged vertical cross sectional view taken on the line 3—3 of Figure 2.

Figure 4 is a transverse vertical cross sectional view taken on the line 4—4 of Figure 3.

Referring to the drawings, and more particularly to Figure 1, 11 designates an internal combustion engine, for example, an engine of the "V-eight" type commonly employed on motor vehicles. The engine 11 is provided with the respective exhaust manifolds 12, 12 located on the opposite sides of the engine and receiving the exhaust gases from the cylinders thereof. The exhaust manifolds 12, 12 are connected by conduits 13 to tail pipes 14 through respective mufflers in the conventional manner. Included in the connections between the conduits 13 and the exhaust pipes 14 are respective filter chambers 15 into which the conduits 13 discharge, each conduit extending through one end wall 16 of its associated filter chamber 15 and being secured in a filter unit 17, illustrated in detail in Figures 3 and 4.

The filter unit 17 comprises a generally cylindrical body of porous carbon or similar absorbent material, shown at 18, said body including the spaced, axially aligned, circular washer members 19 embedded in the porous carbon mass 18. Radially extending plate members 20 are secured between adjacent washer members 19 and are rigidly secured at their outer ends to the inside surface of the generally cylindrical main wall 21 of the filter chamber 15. Similar horizontally extending radial plates 22, 22 are likewise secured between spaced pairs of washer members 19 and are secured at their outer ends to the inside surface of the cylindrical wall 21. Gas discharging from the end of the conduit 13 passes through porous carbon mass 18, entering the mass at a recess 23 formed adjacent the discharge end of the conduit 13, as shown in Figure 3. The gas permeates through the porous carbon 18 and a large proportion thereof is absorbed by the porous carbon, the remainder passing through the chamber 15 and emerging therefrom at its end wall 24 into the exhaust pipe 14, as shown in Figure 3.

Designated at 25 is a vertical reservoir which is mounted in the engine compartment of the vehicle, being secured, for example, to the fire wall 26 by a clamping bracket 27, as shown in Figure 2. Also secured to said fire wall is a supporting plate 28 on which is mounted an air compressor 29 which is provided with a driving motor 30.

The reservoir 25 is provided with a top cover 31 which is centrally formed with an upstanding chamber 32 having a pair of laterally directed outlet nozzles 33, 33.

Respective discharge nozzles 34 are mounted in the walls of the connection conduit elements 35 of the respective exhaust manifolds 12, as shown in Figure 1, the nozzles 34 being formed with discharge apertures 36 which extend into the conduit members 35 and which are adapted to provide a spray of liquid in the conduit member in the path of exhaust gases leaving the associated exhaust manifold 12. The respective nozzle members 33 are connected to the discharge nozzles 34 by respective flexible conduits 37, 37.

Respective aspirator tubes 38, 38 are mounted in the reservoir 25, the aspirator tubes communicating with aspirator jet nozzles 39, 39 axially aligned with the discharge nozzles 33, 33, as shown in Figure 1. The aspirator tubes 38, 38 extend downwardly into the reservoir 25 and terminate adjacent the bottom of the reservoir, as shown in Figure 1.

The respective aspirator chambers 40, 40, namely, the spaces between the aspirator nozzles 39 and the discharge nozzles 33, communicate with a conduit element 41 which is connected through a solenoid valve 42 and a pressure-regulating valve 43 to the outlet conduit 44 of the compressor 29. When solenoid valve 42 is energized, it establishes communication through the pressure-regulating valve 43 to the compressor outlet conduit 44, whereby compressed air is supplied to the conduit element 41 and provides aspirator action in the spaces 40, 40, causing liquid to be aspirated into the flexible conduits 37, 37 from the reservoir 25. This liquid is discharged through the nozzles 34, 34 into the exhaust elements 35, in the path of the exhaust gases discharging from the manifolds 12.

A suitable chemical vaporizing liquid 46 is provided in the reservoir 25, this liquid being of a nature which vaporizes the gaseous products of combustion from an internal combustion engine and in itself being commercially available.

The reservoir 25 is provided with a suitable filling spout 48 having the removable top cover 49.

Designated at 50 is a motor vehicle battery which has one grounded material, as shown at 51. The other terminal of the battery 50 is connected through the ignition switch 52 to a wire 53 leading to the ignition circuit of the vehicle. One terminal of the winding of the solenoid valve 42 is connected by a wire 54 to the ignition wire 53. The remaining terminal of the winding of solenoid valve 42 is connected to a wire 55 which is in turn connected through a temperature-responsive switch 56 to ground. The switch 56 is mounted in the engine 11 and is normally open, closing only when the engine reaches a predetermined temperature approximating the normal operating temperature of the engine.

Thus, valve 42 opens when the engine has reached its operating temperature and establishes communication between the compressor 29 and the aspirator pump means contained in the reservoir 25.

As shown, one terminal of the compressor motor 30 is grounded and the other terminal is connected by a wire 57 to a wire 58, which is in turn connected to the wire 54 through a control switch 59. By closing control switch 59 the compressor motor 30 is energized, causing operation of the compressor, whereby compressed air is supplied through the pressure-regulating valve 43 to the pump means defined by the aspirator elements mounted on the pump of the reservoir 25. The simultaneous energization of motor 30 and solenoid valve 42 thus causes the chemical vaporizing liquid to be discharged through the nozzles 34 and the jet openings 36 thereof into the path of movement of the exhaust gases leaving the manifolds 12, whereby such exhaust gases are vaporized to a substantial degree, leaving relatively little gas to be further filtered in the chambers 15.

Mounted in the lower portion of the reservoir 25 is an indicating switch 60 comprising a pivoted float member 61 which is engageable with the operating element of a normally open microswitch 62, whereby the float element 61 drops into engagement with the switch 62 to close same responsive to the depletion of the gas-absorbing liquid 46. An indicating lamp 63 is mounted on the dashboard of the vehicle, one terminal of the lamp being grounded, as shown, and the other terminal being connected by a wire 64 to one terminal of the indicating switch 60. The other terminal of the indicating switch 60 is connected to the wire 58. Thus, the lamp 63 becomes energized when the liquid in reservoir 25 drops to a predetermined low level, since the ungrounded terminal of the lamp 63 is then connected through the wire 64, the switch 60, the wire 58 and the switch 59 to the wire 54, which is in turn connected to the ignition wire 53.

Another indicating lamp 70 is connected in parallel with the winding of the solenoid valve 42 by respective wires 71 and 72, wire 71 being connected to the wire 54 and wire 72 being connected to the wire 55. Thus, the lamp 70, which is mounted on the vehicle dashboard, becomes energized responsive to the energization of the solenoid valve 42, namely, when switch 56 closes after the engine has been placed in operation.

As will be readily apparent, after the engine has been started and the switch 56 closes, the smoke-absorbing apparatus may be placed in operation by closing the switch 59, which energizes the compressor motor 30. Energization of the signal lamp 70 indicates that the motor has reached the proper temperature for normal operation and that the solenoid valve 42 is energized. Thus, the compressor control switch 59 is not closed until lamp 70 becomes energized.

Energization of the signal lamp 63 indicates that the liquid 46 has dropped to a relatively low level in the reservoir 25, whereby replenishment of the liquid is required. However, no need is then present for discontinuing operation of the smoke-absorbing apparatus, since no damage to the apparatus can occur even if reservoir 25 becomes completely empty.

The pressure-regulating valve 43 is of conventional construction and provides a predetermined desirable air pressure in the aspirator spaces 40, for example, a pressure of ten pounds per square inch. Obviously, the valve 43 may be set to provide any other desirable pressure in the aspirator spaces.

While a specific embodiment of an improved smoke-absorbing apparatus for internal combustion engines has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, an internal combustion engine having an exhaust manifold, an exhaust pipe, and a conduit connecting said exhaust manifold to said exhaust pipe, a reservoir containing vaporizing liquid, an aspirator chamber on said reservoir, an aspirator tube extending into said reservoir, said aspirator tube having an aspirating jet nozzle at its top and discharging into said chamber, an air compressor, a discharge nozzle mounted in said conduit, first conduit means connecting the outlet of said compressor to said chamber, second conduit means connecting said chamber to said discharge nozzle, whereby to inject said vaporizing liquid into said conduit, a temperature-sensitive member mounted in said engine, and valve means in said first conduit means controlled by said temperature-sensitive member.

2. In combination, an internal combustion engine having an exhaust manifold, an exhaust pipe, and a conduit connecting said exhaust manifold to said exhaust pipe, a reservoir containing vaporizing liquid, an aspirator chamber on said reservoir, an aspirator tube extending into said reservoir, said aspirator tube having an aspirating jet nozzle at its top and discharging into said chamber, an air compressor, a discharge nozzle mounted in said conduit, first conduit means connecting the outlet of said compressor to said chamber, second conduit means connecting said chamber to said discharge nozzle, whereby to inject said vaporizing liquid into said conduit, a temperature-responsive switch mounted in said engine, a source of current, a solenoid valve in said first conduit means, and circuit means connecting said source of current to said solenoid valve through said temperature-responsive switch.

3. In combination, an internal combustion engine having an exhaust manifold, an exhaust pipe, and a conduit connecting said exhaust manifold to said exhaust pipe, a reservoir containing vaporizing liquid, an aspirator chamber on said reservoir, an aspirator tube extending into said reservoir, said aspirator tube having an aspirating jet nozzle at its top and discharging into said chamber, an air compressor, a discharge nozzle mounted in said conduit, first conduit means connecting the outlet of said compressor to said chamber, second conduit means connecting said chamber to said discharge nozzle, whereby to inject said vaporizing liquid into said conduit, a temperature-responsive switch mounted in said engine, a source of current, a solenoid valve in said first conduit means, circuit means connecting said source of current to said solenoid valve through said temperature-responsive switch, a filter chamber containing smoke-filtering material, and means communicatively connecting said exhaust pipe to said filter chamber.

References Cited in the file of this patent

UNITED STATES PATENTS

| | | |
|---|---|---|
| 1,691,223 | Brooks et al. | Nov. 13, 1928 |
| 2,409,496 | Kelley | Oct. 15, 1946 |
| 2,709,335 | Van Vactor | May 31, 1955 |
| 2,738,854 | Thrower | Mar. 20, 1956 |
| 2,879,562 | Olson | Mar. 31, 1959 |

FOREIGN PATENTS

| | | |
|---|---|---|
| 689,264 | France | Sept. 4, 1930 |
| 782,372 | Great Britain | Sept. 4, 1957 |